UNITED STATES PATENT OFFICE.

EDMOND FRANÇOIS MICHAUD AND ERNEST NICOLAS MICHAUD, OF AUBERVILLIERS, FRANCE, ASSIGNORS, BY MESNE ASSIGNMENTS, TO THE CONTINENTAL GLYCERINE COMPANY, OF NEW YORK, N. Y.

PROCESS OF EXTRACTING GLYCERINE FROM FATTY MATTERS.

SPECIFICATION forming part of Letters Patent No. 293,844, dated February 12, 1884.

Application filed October 6, 1883. (No specimens.) Patented in France October 4, 1882, No. 151,404; in England October 27, 1882, No. 5,112; in Germany November 2, 1882, No. 23,213; in Belgium November 8, 1882, No. 59,512; in Russia November 13, 1882, No. 8,159; in Italy November 15, 1882, No. 14,804; in Austria-Hungary February 19, 1883, No. 37,740; in Canada March 31, 1883, No. 15,594, and in Spain May 29, 1883, No. 2,873.

*To all whom it may concern:*

Be it known that we, EDMOND FRANÇOIS MICHAUD and ERNEST NICOLAS MICHAUD, both citizens of the French Republic, and residents of Aubervilliers, (Paris,) France, have jointly invented certain new and useful Improvements in Processes of Extracting Glycerine from Fatty Matters, of which the following is a specification.

The object of our invention is to extract or separate glycerine from neutral fatty matters, whether fats or oils, of animal or vegetable origin into fatty acids, on the one hand, which are immediately utilizable for soap-making or candle-making, and into glycerine-water, on the other, which only requires concentrating to reduce it to marketable condition.

Heretofore various processes have been used for this purpose, the most successful of which, and the one most nearly resembling ours, is that invented by Edmond O. Baujard, and patented July 10, 1883, No. 280,894. That process consists in placing the fatty matters and water with a small proportion of lime and a zinc preparation (zinc oxide) in a closed vessel or autoclave, and subjecting them to steam-pressure and heat for a sufficient time to effect the decomposition of the fat. The pressure employed was usually about one hundred and twenty-five pounds per square inch, and was continued nearly four hours. This process has been worked in our factory and with success; but we found it subject to the objection that a considerable portion of the fatty acids resulting from it was converted into lime-soap, which is a somewhat stable compound, and not soluble in the caustic soda employed to effect the process of saponification. The presence of this lime-soap consequently hindered saponification and reduced the value of the fatty acids for soap-making. The fatty acids yielded by the said process were also apt to be slightly discolored, so that the soap made from them was less clear or bright than is desirable, and in practice some of the glycerine was lost, its extraction not being quite complete. The experiments which have resulted in our present invention were undertaken in order to find some means of overcoming the above defects, and with the result of so modifying the said process that the fatty acids are produced in such condition that their saponification is not in the least retarded, nor are they at all discolored, and the glycerine is produced in larger quantity and of greater density.

Our process consists, essentially, in placing fat with water and a suitable zinc preparation (without the addition of any calcareous substance—such as lime) in a closed vessel, and subjecting it to heat and pressure until the separation of the glycerine from the fatty acids is effected.

It also consists in the use of a particular zinc preparation for this purpose, being the substance commonly called "zinc-dust" or "zinc-powder," which is a residuum of the distillation of mineral zinc, and contains, chiefly, metallic zinc finely subdivided, a considerable proportion of zinc oxide, and a much smaller proportion of metallic chlorides, and various other metallic and foreign substances. In our process the zinc preparation is active in neutralizing the volatile acids of the fat, and thereby predisposing it to disintegration, it being known that the mutual affinity of the glycerine and fatty acids is greatly dependent on the presence of these volatile acids. In this manner our process is effective without necessarily combining all, or even the greater portion, of the fatty acids with a base, and the fatty acids which are so combined form only a zinc-soap, which is not a stable compound, and which does not hinder saponification with an alkali as practiced in soap-making.

We will now describe our process more in detail, stating the proportions which we have found in practice to give the best results, it being, however, well understood that we do not confine ourselves to the use of these exact proportions.

The apparatus employed consists of a closed vessel, called a "digester" or "autoclave,"

which must be capable of withstanding a heavy internal pressure, and a tank or reservoir, which may be open. A steam-boiler, a pump, and an evaporator are also desirable. Into this autoclave are introduced three thousand (3000) kilos of fat, seven hundred (700) kilos of water, and five (5) to fifteen (15) kilos of "zinc-dust" or "zinc-powder," so called. The zinc-powder is preferably mixed with the water before the latter is introduced. The autoclave is then closed, steam at a pressure of eight to nine kilos per square centimeter is admitted, and the contents of the autoclave are allowed to digest under this pressure, and at the temperature resulting from this pressure, for from three to four hours—usually three hours and a half. During that interval the combined action of the heat and the zinc preparation upon the water and fat has the effect to neutralize all the volatile acids of the fatty body, and eventually to separate the fatty acids from the glycerine, the latter being dissolved in the water, and if any excess of zinc preparation be used, it combines with a corresponding portion of the fatty acids, forming zinc-soap. This zinc-soap is not distinguishable from the fatty acids in appearance or uses, and we will consider it as identical with them. At the termination of the period of pressure, the contents of the autoclave are drawn off into the tank or reservoir, and permitted to stand until all the fatty acids rise to the surface and float above the glycerinous waters below. The latter are then drawn off and evaporated to the requisite density, and the fatty acids are removed and used for soap or candle making, or any other purpose.

We prefer the use of the powder of zinc, because we have found it the most active and effective agent, as by its use a greater proportion of glycerine is extracted, the glycerine is denser, and the fatty acids are whiter and clearer than when any other zinc preparation is employed. Zinc oxide may, however, be substituted for it, or even very finely powdered metallic zinc may be used, which becomes oxidized under the influence of the heat and in the presence of the water which is used.

It is essential to the successful operation of our process that with a given quantity of fat a proportion of from twenty-five to thirty-five one-hundredths of its weight of water and of one to fifteen one-thousandths of its weight of zinc preparation shall be used. The precise proportions will depend always upon the particular conditions of the operation, such as the character of the fat or oil to be treated, the kind and quality of zinc preparation employed, and the pressure that is available. When the pressure is increased or reduced, the time of the treatment must be shortened or lengthened in inverse ratio; also, as the proportion of zinc preparation is increased the pressure or time may usually be proportionately decreased.

One of the advantages resulting from our process is that although the fats before treatment may be of dark color, the fatty acids resulting from the treatment are white and clear and available for manufacture into soaps of fine quality. It should be observed that our process leaves the fatty acids either uncombined with any other substance or combined only with zinc oxide, which is a weak base, forming zinc-soap, which is an unstable compound, and is readily decomposed by the caustic alkalies used in soap-making, whereas by the Baujard process and other processes of calcareous extraction the fatty acids are delivered in combination with lime, which is a strong base, and requires to be displaced with acid before the fatty matters are freed. Our process possesses also the same advantage over the previous processes of alkaline extraction in which the fatty acids are left in a state of alkaline saponification, which necessitates the treatment with acid to neutralize the alkali before the fatty acids are available. The use of our process obviates the necessity for this difficult, expensive, and wasteful after-treatment with acid, the fatty acids being immediately available for industrial uses.

We claim as our invention—

1. The process of extracting glycerine from fatty matters, which consists in placing the fatty matters with water and a zinc preparation, and without other more powerful base, in a closed vessel and subjecting the same to heat and pressure until the separation is effected, substantially as set forth.

2. The process of extracting glycerine from fatty matters, which consists in placing the fatty matters with water and a zinc preparation, and in the absence of calcareous or alkaline substances, in a closed vessel, subjecting the same to steam-pressure for a sufficient time, and separating the water containing the glycerine from the resulting fatty acids, substantially as set forth.

3. The process of extracting glycerine from fatty matters, which consists in adding to said fatty matters water and a zinc preparation known as "zinc-powder," and consisting, principally, of finely-divided metallic zinc and zinc oxide, and subjecting the mixture to the action of heat, substantially as set forth.

In witness whereof we have hereunto signed our names in the presence of two subscribing witnesses.

EDMOND FRANÇOIS MICHAUD.
ERNEST NICOLAS MICHAUD.

Witnesses:
GEORGE WALKER,
J. S. WALKER.